(12) United States Patent
Huang

(10) Patent No.: US 8,300,160 B2
(45) Date of Patent: Oct. 30, 2012

(54) PROJECTOR SYSTEM

(75) Inventor: Yung-Lun Huang, Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 188 days.

(21) Appl. No.: 12/972,525

(22) Filed: Dec. 20, 2010

(65) Prior Publication Data

US 2012/0069252 A1    Mar. 22, 2012

(30) Foreign Application Priority Data

Sep. 21, 2010    (TW) .............................. 99131904 A

(51) Int. Cl.
*G02F 1/1335* (2006.01)
(52) U.S. Cl. .............. 349/9; 349/5; 349/6; 349/7; 349/8
(58) Field of Classification Search ................ 349/5–9
See application file for complete search history.

(56) References Cited

U.S. PATENT DOCUMENTS

2002/0109795 A1 *    8/2002    Bruzzone et al. ................ 349/9

* cited by examiner

*Primary Examiner* — Richard Kim
*Assistant Examiner* — David Chung
(74) *Attorney, Agent, or Firm* — Altis Law Group, Inc.

(57) ABSTRACT

A projector system includes a light source module, a light guiding plate, a polarizing beam splitter (PBS) module and a projection lens module. The light source unit includes a red-color light source, a green-color light source and a blue-color light source respectively for emitting red, green and blue light. The light guiding plate optically combines light emitted from the red-color light source, the green-color light source and the blue-color light source. The PBS module is positioned opposite to the light output surface of the light guiding plate and is configured for splitting the combined light into s-polarization light and p-polarization light, reflecting the s-polarization light and converting the reflected s-polarization light into p-polarization light, modulating and outputting the converted p-polarization light using a display information signal. The projection lens module projects light with information onto a screen.

11 Claims, 1 Drawing Sheet

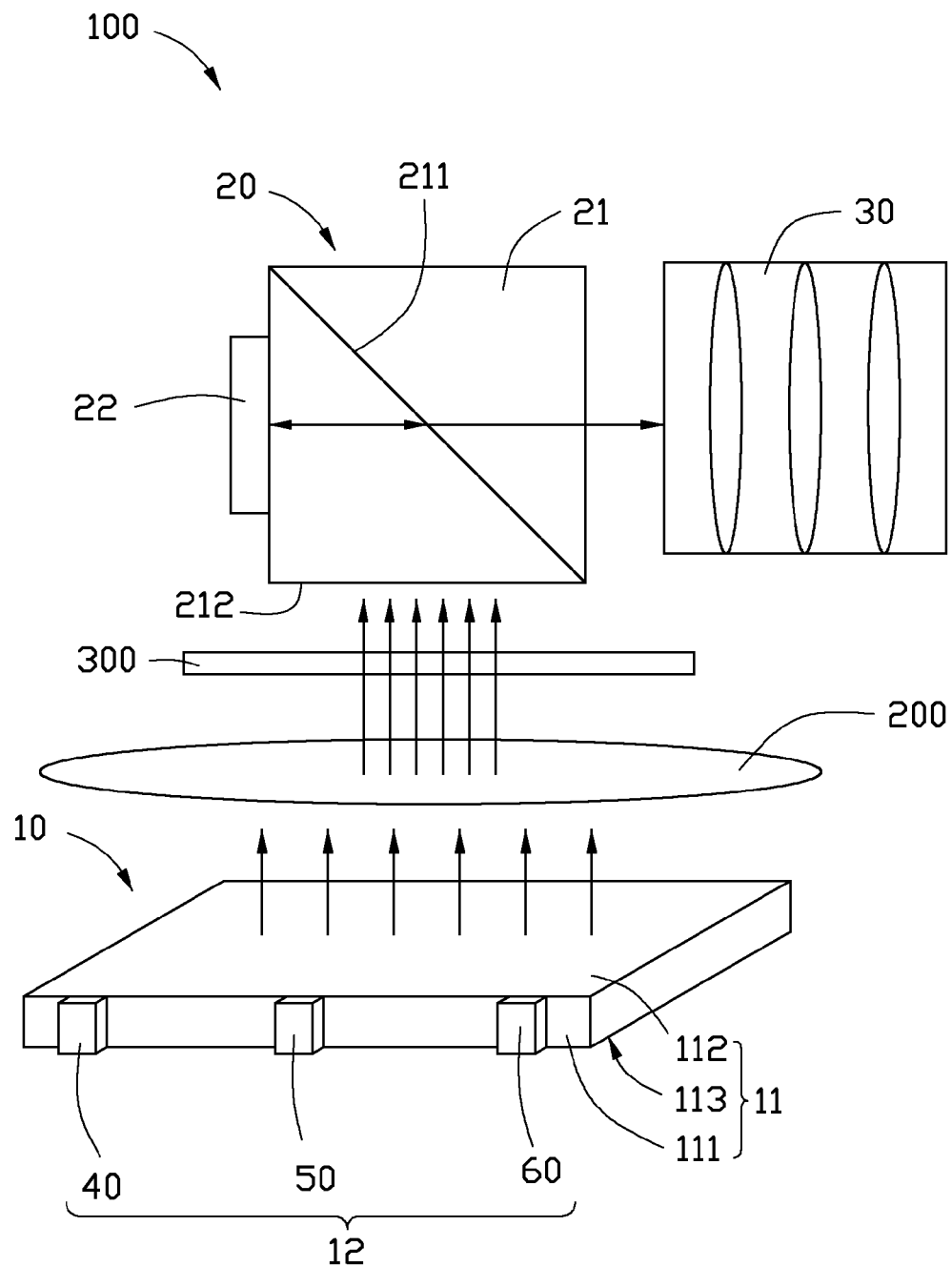

PROJECTOR SYSTEM

BACKGROUND

1. Technical Field

The present disclosure relates to a projector system, and particularly, relates a projector system based on technology of Liquid Crystal on Silicon (LCOS).

2. Description of Related Art

A LCOS projector system typically includes a light source, two dichroic mirrors for separating emitting light into red, green, and blue light beams. Three polarizing beam splitters for splitting the light beam into p-polarization and s-polarization light, three LCOS panels each corresponding to a polarizing beam splitter, and a light combining unit optically combining the red, green, and blue light beams into a projected light beam. The optical path in the LCOS projector system is complicated and the volume of the LCOS projector system is large because of so many optical elements.

What is needed therefore is an electrical energy generating device addressing the above-mentioned problems.

BRIEF DESCRIPTION OF THE DRAWINGS

The FIGURE is a schematic view of a projector system according to an exemplary embodiment of the present disclosure.

DETAILED DESCRIPTION

Referring to the FIGURE, a projector system 100, according to an exemplary embodiment, is shown. The projector system 100 includes a light source module 10, a polarizing beam splitter (PBS) module 20, and a projection lens module 30.

The light source module 10 includes a light source unit 12 and a light guiding plate 11. The light source unit 12 includes red-color light source 40, a green-color light source 50 and a blue-color light source 60. The red-color light source 40 is red LED source for emitting red light, the green-color light source 50 is green LED source for emitting green light, and the blue-color light source 60 is blue LED source for emitting blue light.

The light guiding plate 11 is substantially rectangular. The light guiding plate 11 includes a light input surface 111, a light output surface 112 and a light reflecting surface 113. The light output surface 112 and the light reflecting surface 113 are opposite sides of the light guiding plate 11. The light input surface 111 is connected to the light output surface 112 and the light reflecting surface 113. The red-color light source 40, the green-color light source 50, and the blue-color light source 60 are arranged at a common side of the light guiding plate and face toward the light input surface 111. In this embodiment, the red-color light source 40, the green-color light source 50 and the blue-color light source 60 are directly positioned on the light input surface 111. In addition, a number of micro-structured reflecting units (not shown) are preferably formed on the light reflecting surface 113 for uniformly mixing incidence light.

The PBS module 20 is positioned opposite to the light output surface 112 of the light guiding plate 11. The PBS module 20 includes a polarizing beam splitter 21 and a LCOS panel 22. The polarizing beam splitter 21 is substantially a cube which includes a light incidence surface 212 opposite to the light output surface 112 of the light guiding plate 11 and a polarizing beam splitting surface 211. The polarizing beam splitting surface 211 is a diagonal plane of the polarizing beam splitter 21. The polarizing beam splitting surface 211 reflects s-polarization light and allows p-polarization light to pass therethrough. The LCOS panel 22 is positioned on a surface of the polarizing beam splitter 21 and transforms modulating incidence light into light with display information signal, converts s-polarization light into p-polarization light and reflects light with display information signal to the projection lens module 30.

The projection lens module 30 is positioned nearby a surface of the polarizing beam splitter 21 away from the LCOS panel 22 and projects light with display information signal onto a screen (not shown).

The projector system 100 further includes a concentrating lens assembly 200 arranged between the light output surface 112 of the light guiding plate 11 and the light incidence surface 212 of the polarizing beam splitter 21. In this embodiment, the concentrating lens assembly 200 is a Fresnel lens. The concentrating lens assembly 200 concentrates light from the light guiding plate 22.

In application, the red-color light source 40, the green-color light source 50 and the blue-color light source 60 respectively emit red light, green light, and blue light. The red light, the green light and the blue light enter into the light guiding plate 11 through the light input surface 111 and are optically combined as uniformly mixed light by the light guiding plate 11. The combined light exits the light guiding plate 11 through the light output surface 112 and then is concentrated by the concentrating lens assembly 200 into a concentrated light. The concentrated parallel light enters into the polarizing beam splitter 21, and is split into s-polarization light and p-polarization light, the s-polarization light is reflected by the polarizing beam splitting surface 211, and the p-polarization light directly passes through the polarizing beam splitting surface 211. The s-polarization light reflected by the polarizing beam splitting surface 211 is projected onto the LCOS panel 22, and then is modulated into light with display information signal and converted into p-polarization light by the LCOS panel 22. The p-polarization light with display information signal is reflected into the polarizing beam splitter 21 by the LCOS panel 22. The p-polarization light with display information signal passes through the polarizing beam splitter 21 and enters into the projection lens module 30. Then the projection lens module can project the p-polarization light with display information signal onto a screen (not shown).

In the present embodiment, the projector system 100 further includes a polarization converting member 300 positioned between the light output surface 112 of the light guiding plate 11 and the light incidence surface 212 of the polarizing beam splitter 21. The polarization converting member 300 converts p-polarization light into s-polarization light. Therefore, the loss of p-polarization light at the polarizing beam splitting surface 211 can be avoided.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A projector system comprising:
   a light source module comprising a red-color light source for emitting red light, a green-color light source for emitting green light and a blue-color light source for emitting blue light;

a light guiding plate configured for optically combining the red light, the green light, and the blue light, the light guiding plate comprising a light input surface, a light output surface and a light reflecting surface, the red-color light source, the green-color light source and the blue-color light source facing toward the light input surface;

a polarizing beam splitter (PBS) module configured for splitting the combined red light, green light and blue light into s-polarization light and p-polarization light, reflecting the s-polarization light and converting the reflected s-polarization light into p-polarization light, modulating and outputting the converted p-polarization light using a display information signal, the PBS module being opposite to the light output surface of the light guiding plate; and a projection lens module configured for projecting the modulated p-polarization light onto a screen panel.

2. The projector system of claim 1, wherein the red-color light source, the green-color light source and the blue-color light source are arranged at a common side of the light guiding plate.

3. The projector system of claim 1, wherein the light guiding plate is substantially rectangular, the light output surface and the light reflecting surface are at opposite sides of the light guiding plate, and the light input surface is connected between the light output surface and the light reflecting surface.

4. The projector system of claim 1, wherein the PBS module comprises a polarizing beam splitter and a LCOS panel, the polarizing beam splitter is configured for splitting the combined red light, green light and blue light into s-polarization light and p-polarization light, and the LCOS panel is configured for modulating the s-polarization light.

5. The projector system of claim 4, wherein the polarizing beam splitter is substantially a cube, the polarizing beam splitter comprises a light incidence surface opposite to the light output surface of the light guiding plate and a polarizing beam splitting surface configured for splitting the combined red light, green light and blue light into the s-polarization light and the p-polarization light.

6. The projector system of claim 5, wherein the polarizing beam splitting surface is configured for reflecting the s-polarization light to the LCOS panel and allowing the p-polarization light to pass therethrough, and the LCOS panel is configured for converting the reflected s-polarization light into p-polarization light and modulating the converted p-polarization light using the display information signal.

7. The projector system of claim 5, wherein the polarizing beam splitting surface is a diagonal plane of the polarizing beam splitter.

8. The projector system of claim 1, further comprising a converging lens arranged between the light output surface of the light guiding plate and PBS module.

9. The projector system of claim 8, wherein the converging lens is a Fresnel lens.

10. The projector system of claim 1, further comprising a polarization converting member positioned between the light output surface of the light guiding plate and the polarizing beam splitter, the polarization converting member being configured for converting p-polarization light into s-polarization light.

11. A projector system comprising:
 a first light source for emitting red light;
 a second light source for emitting green light;
 a third light source for emitting blue light;
 a light guiding plate comprising a light output surface, the light guide plate configured for optically combining the red light, the green light, and the blue light, and outputting combined light through the light output surface;
 a polarizing beam splitter comprising a polarizing beam splitting surface configured for receiving and splitting the combined light into s-polarization light and p-polarization, reflecting the s-polarization light, and allowing the p-polarization light to pass therethrough;
 a LCOS panel configured for converting the reflected s-polarization light into p-polarization light and modulating the converted p-polarization light using a display information signal; and
 a projection lens module configured for projecting the modulated p-polarization light onto a screen panel.

* * * * *